United States Patent [19]

Alexander

[11] Patent Number: 4,470,098

[45] Date of Patent: Sep. 4, 1984

[54] MULTILAYER CERAMIC DIELECTRIC CAPACITORS

[75] Inventor: John H. Alexander, Stortford, England

[73] Assignee: ITT Industries, Inc., New York, N.Y.

[21] Appl. No.: 467,532

[22] Filed: Feb. 17, 1983

[30] Foreign Application Priority Data

Feb. 18, 1982 [GB] United Kingdom ............... 820477

[51] Int. Cl.³ ..................... H01G 3/06; H01G 4/12
[52] U.S. Cl. ................................. 361/321; 29/25.42
[58] Field of Search ............ 29/25.42; 361/312, 313, 361/321

[56] References Cited

U.S. PATENT DOCUMENTS

| | | | |
|---|---|---|---|
| 2,861,321 | 11/1958 | Barnard et al. | 29/25.42 |
| 3,852,877 | 12/1974 | Ahm et al. | 29/25.42 X |
| 3,879,645 | 4/1975 | Rutt et al. | 361/321 |
| 4,301,580 | 11/1981 | Wallace | 29/25.42 |
| 4,342,143 | 8/1982 | Jennings | 29/25.42 |
| 4,347,650 | 9/1982 | McLarney et al. | 29/25.42 |

FOREIGN PATENT DOCUMENTS

| | | |
|---|---|---|
| 1246784 | 9/1971 | United Kingdom . |
| 1272490 | 4/1972 | United Kingdom . |
| 1285525 | 8/1972 | United Kingdom . |
| 1486794 | 9/1977 | United Kingdom . |
| 1510891 | 5/1978 | United Kingdom . |

Primary Examiner—Donald A. Griffin
Attorney, Agent, or Firm—John T. O'Halloran; Peter R. Ruzek; Mary C. Werner

[57] ABSTRACT

A multilayer ceramic dielectric capacitor comprises a plurality of layers of dielectric arranged in a stack. Between the dielectric layers are arranged metallic electrodes. Alternate electrodes in the stack extend to opposite end faces thereof, where they are electrically connected by end terminations. The electrodes each comprise a plurality of parallel conductive elements provided between two adjacent dielectric layers. The adjacent dielectric layers are bonded together along three of their edges and at the gaps between the conductive elements, thus providing a stronger structure than when the adjacent layers are only bonded at the three of their edges. The electrode pattern comprised by a plurality of parallel elements is particularly applicable to metal-impregnated ceramic dielectric capacitors, which employ fugitive electrodes that are burnt away during firing of the ceramic to leave spaces for subsequent metal impregnation.

6 Claims, 4 Drawing Figures

MULTILAYER CERAMIC DIELECTRIC CAPACITORS

BACKGROUND OF THE INVENTION

This invention relates to electrical components, such as multilayer ceramic dielectric capacitors and in particular, although not exclusively, to metal-impregnated-electrode multilayer-ceramic-dielectric capacitors.

A multilayer ceramic dielectric capacitor basically comprises a stack of ceramic dielectric layers with electrodes arranged between adjacent ceramic layers. During manufacture a firing process is employed to bond the adjacent ceramic layers together and particularly in the case of fugitive electrodes the ceramic layers can bend or buckle during the firing process, when the fugitive electrodes are burnt away. A number of ways have previously been suggested to improve the integrity of the structure, for example it is known to add ceramic particles to the fugitive electrode ink so that an electrode cavity with a porous structure results rather than a continuous cavity.

SUMMARY OF THE PRESENT INVENTION

It is thus an object of the present invention to provide an alternative method of improving the integrity of a multilayer ceramic dielectric capacitor.

According to one aspect of the present invention there is provided a method of manufacturing an electrical component including providing an electrically-insulating substrate, forming an electrode comprised by a plurality of parallel conductive lines or strips on the substrate, providing an electrically-insulating layer over the electrode pattern on the insulating substrate and bonding the insulating layer to the insulating substrate at least at the gaps between the parallel lines.

According to another aspect of the present invention there is provided an electrical component comprising a plurality of layers of an electrically insulating material, wherein at least two adjacent layers of the plurality are bonded together along a plurality of parallel lines, which may or may not include their edges, whereby a plurality of parallel elongate spaces are provided between the two adjacent layers, and wherein a conductive metal is arranged in the spaces.

According to a further aspect of the present invention there is provided an electrical component including a plurality of layers of electrically insulating material with an electrode provided between two adjacent layers of the plurality, the electrode comprising a plurality of parallel conductive elements, the adjacent layers of insulating material being bonded together at least at the gaps between the conductive elements.

BRIEF DESCRIPTION OF THE DRAWING

For a better understanding of the invention, embodiments thereof will now be described with reference to the accompanying drawing, in which.

DESCRIPTION OF THE PREFERRED EMBODIMENT

Figure 1:
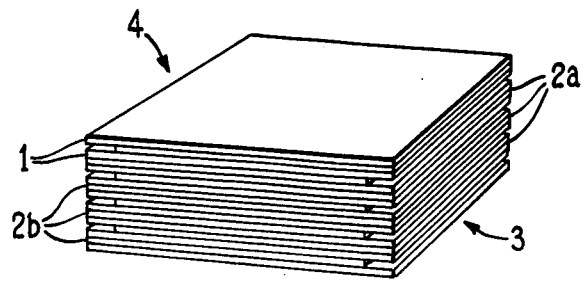
FIG. 1 shows a perspective schematic view of a basic multilayer-ceramic-dielectric capacitor structure.
Figure 2:
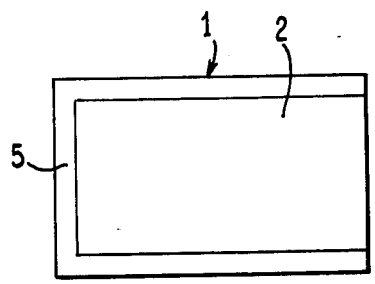
FIG. 2 shows a plan view of one dielectric layer with a conventional electrode pattern thereon.

A basic structure as shown in FIG. 1 comprises a stack of ceramic dielectric layers 1 with electrodes 2a and 2b therebetween. Alternate electrodes 2a terminate at the right hand face 3 and do not extend completely to the left hand face 4, whereas alternate electrodes 2b extend to the left hand face 4, but do not reach the right hand face 3. Thus the electrodes 2b can be electrically interconnected at the end face 4 (end terminated) and the electrodes 2a can be likewise electrically interconnected at the end face 3, to form two electrically-insulated sets of electrodes 2a and 2b. In order to facilitate preparation and understanding of FIG. 1 of the drawings that figure shows the electrode sets extending to the lateral sides of the stack. However, in practice neither set of electrodes extend to the lateral sides, which in the finished device are all ceramic. FIG. 2 shows a plan view of one dielectric layer 1 on which is rectangular electrode 2 has been provided by, for example, a screen printing process. The electrode 2 extends up to one end edge of the dielectric layer 1, but a margin 5 is left between the remaining edges of electrode and the dielectric layer.

The manufacture of multilayer-ceramic-dielectric capacitors with the basic structure shown in FIG. 1 comprises the following steps. Green (unfired) ceramic sheets of, for example, barium titanate are prepared in a conventional manner, for example tape casting, tape drawing or printing. In order to manufacture capacitors in quantity a screen-printing technique may be employed to print a large number of electrodes side-by-side on one relatively large sheet of green ceramic, although alternatively a single electrode may be provided on a suitably sized sheet of green ceramic. The electrodes may be printed by means of a conductive ink or paste comprised of a high melting point precious metal, or in the case of metal-impregnated-electrodes, the electrodes on the green ceramic comprise fugitive electrodes which are printed by means of a fugitive electrode ink, comprising a charcoal powder with a binder and solvent such as to make it compatible with the green ceramic. Further sheets are similarly printed. A number of such sheets, the number corresponding to the number of electrodes in each capacitor, are stacked one on top of the other, with the electrodes staggered and partially overlying one another as illustrated schematically in FIG. 1. A blank green ceramic sheet is applied to the top of the stack. Extra blank green ceramic sheets may be applied to the top and bottom of the stack in order to protect the outer electrodes and give adequate strength to the finished device. The block of stacked green ceramic sheets thus formed is cut to make individual green capacitor elements.

The green capacitor elements are then fired. In the case of precious metal ink or paste electrodes, firing results in elements having substantially continuous sheets of metal between sealed-together ceramic sheets. In the case of fugitive electrode devices the green capacitor elements are heated at, for example, 1° C./min. to 350° C. to bake out the binders in the fugitive ink and the green ceramic, before firing at, for example, 200° C./hour to 1120° C. for two hours, in a conventional manner, during which firing the charcoal of the fugitive ink burns, providing corresponding spaces between the dielectric layers, comprised by the fired ceramic sheets, which sheets become bonded together during the firing process except where the fugitive electrodes where provided. The spaces are subsequently filled with a metal, such as lead, in a metal-impregnation process.

The dielectric layers 1 between the electrodes 2 are presently of the order of 25 to 50 micrometers thick and, as previously mentioned and particularly in the case where fugitive electrodes are employed, the layers can bend or buckle during the firing process when the fugitive electrodes are burnt away.

We have found, however, that the fugitive electrode cavities can be more precisely defined and dielectric layer-to-layer attachment can be provided, to prevent or at least minimise any bending or buckling of the dielectric layers during firing, merely by changing the pattern used for the fugitive electrodes.

Figure 3:
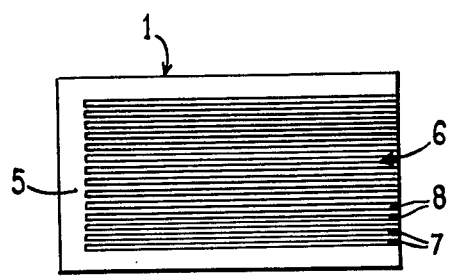
FIG. 3 shows a plan view of one dielectric layer with an electrode pattern according to one embodiment of the present invention.

FIG. 3 shows one screen printed electrode pattern 6 according to the present invention provided on a green ceramic sheet 1. The pattern comprises a series of closely spaced parallel lines or strips 7 rather than the continuous area shown in FIG. 2. During subsequent manufacturing stages the gaps 8 between the lines become filled with ceramic dielectric. This may be when a sheet of green ceramic tape is applied to the original sheet and the two sheets compacted, or when a layer of dielectric is screen printed onto the original sheet. In the case of closely spaced parallel lines provided with a fugitive ink, and after stacking and firing, which may be conventional firing as described above, to remove the fugitive electrodes, the resultant structures include a series of parallel walls, which support or join the ceramic layers, and an electrode cavity comprised by a series of corresponding parallel elongate spaces. The structure is much stronger than the conventional structures and this is achieved without a significant loss of capacitance in dependence on the relative dimensions of the lines 7 and gaps 8. Typically the lines maybe 1.5 mm wide and the gaps may be 0.2 mm wide.

The fired capacitor elements are end terminated at faces 3 and 4 (FIG. 1) whereby to connect the respective sets of spaces between the dielectric layers corresponding to electrodes 2a and 2b. The methods and materials employed for providing such end terminations are various and may comprise applying silver in conductive paint form or air firing aluminium containing glass frits thereonto, as described for example in our co-pending U.S. application Ser. No. 404,745 filed Aug. 3, 1982 (J. H. Alexander). The metal impregnation of the electrode spaces in the case of fugitive electrode devices, may be carried out in a conventional manner.

Figure 4:
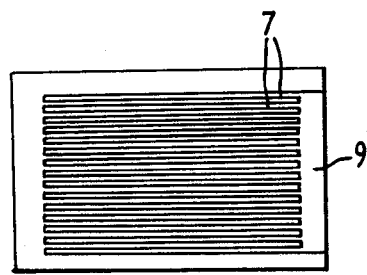
FIG. 4 shows a plan view of one dielectric layer with an alternative electrode pattern according to the present invention.

In order to facilitate electrical connection between the line structure of the electrodes and the applied end terminations, the modified electrode structure shown in FIG. 4 may be employed. The structure still includes a series of closely-spaced parallel lines 7, however the lines are joined at one end 9, which end is adjacent a ceramic sheet edge, to form a comb-like pattern. Other patterns based on a series of closely-spaced parallel lines, but in which, for example, groups of the lines are interconnected to facilitate end-termination connection, can be envisaged. The lines may be other than straight as illustrated, for example they may be sinuous, however one end of each line should extend to one ceramic sheet edge.

As dielectric layers are gradually being made thinner, methods to control and strengthen them become important, particularly but not exclusively in the case of metal-impregnated capacitors, the present invention is considered to be one method by which the manufacture of such capacitors may be better controlled. The parallel walls provided between the dielectric layers give added integrity and the devices are more consistent in capacitive properties than those produced when ceramic particles are added to the fugitive ink to improve the integrity of the structure.

What is claimed is:

1. A method of manufacturing a multilayer ceramic capacitor comprising the steps of:
   producing a plurality of sheets of an unfired dielectric material;
   forming a pattern of spaced parallel strips of a fugitive electrode material which becomes flowable at a predetermined temperature on at least some of the sheets, said strips extending to a common edge;
   stacking said sheets such that said pattern is confined between two adjacent sheets and alternate fugitive electrode material extends to opposite end faces of the stack;
   firing the stack at said predetermined temperature to bond said sheets together at areas devoid of said fugitive electrode material and to cause said fugitive electrode material to escape from said sheets establishing voids at such locations; and
   impregnating said voids with lead to obtain electrodes.

2. The method as claimed in claim 1, further including the step of providing end terminations on the opposite end faces of the stack.

3. A multilayer ceramic capacitor comprising a stack of layers of ceramic material and an electrode provided between at least two adjacent layers, said electrode being of lead and arranged in a pattern of spaced parallel strips which extend to a common edge of said layers, said layers being bonded together at least at the locations devoid of said electrode.

4. A method of manufacturing a multilayer ceramic capacitor comprising the steps of:
   producing a plurality of sheets of an unfired dielectric material;
   forming a pattern of spaced parallel strips of a fugitive electrode material which becomes flowable at a predetermined temperature on at least some of the sheets;
   stacking said sheets such that said pattern is confined between two adjacent sheets;
   firing the stack at said predetermined temperature to bond said sheets together at areas devoid of said fugitive electrode material and to cause said fugitive electrode material to escape from said sheets establishing voids at such locations; and
   impregnating said voids with a metal to obtain electrodes.

5. A multilayer ceramic capacitor comprising a stack of layers of ceramic material and an electrode provided between at least two adjacent layers, said electrode being of a conductive material and being arranged in a pattern of spaced parallel strips, said layers being bonded together at least at the locations devoid of said electrode.

6. A multilayer ceramic capacitor comprising a stack of layers of ceramic formed from unfired ceramic material, and an electrode provided between at least two adjacent layers and being arranged in a pattern of spaced parallel strips, said electrode being constituted by a conductive material impregnated in voids which were formed between the layers when a fugitive electrode material escaped from between the layers at a temperature approaching that of the firing temperature of the ceramic, said adjacent layers being bonded together at locations adjacent said electrode.

* * * * *